United States Patent
Cluet

(10) Patent No.: US 11,618,359 B2
(45) Date of Patent: Apr. 4, 2023

(54) ADAPTABLE ARMREST FOR A SET OF VEHICLE SEAT

(71) Applicant: FAURECIA Sièges d'Automobile, Nanterre (FR)

(72) Inventor: Mathieu Cluet, Etampes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/317,127

(22) Filed: May 11, 2021

(65) Prior Publication Data

US 2021/0354609 A1 Nov. 18, 2021

(30) Foreign Application Priority Data

May 13, 2020 (FR) ..................... 20 04686

(51) Int. Cl.
*B60N 2/01* (2006.01)
*B60N 2/75* (2018.01)
*B60N 3/10* (2006.01)

(52) U.S. Cl.
CPC .............. *B60N 2/767* (2018.02); *B60N 2/01* (2013.01); *B60N 2/793* (2018.02); *B60N 2/797* (2018.02); *B60N 3/10* (2013.01)

(58) Field of Classification Search
CPC .......... B60N 2/767; B60N 2/01; B60N 2/797; B60N 2/793; B60N 3/10
USPC ..................................... 297/411.38
See application file for complete search history.

(56) References Cited

U.S. PATENT DOCUMENTS

| 5,752,739 A * | 5/1998 | Saeki ..................... | B60N 2/757 297/411.32 |
| 2003/0020315 A1* | 1/2003 | Laval ..................... | B60N 2/753 297/411.32 |
| 2009/0045663 A1 | 2/2009 | Tamakoshi | |
| 2012/0223564 A1* | 9/2012 | Andersson ............. | B60N 2/757 297/411.3 |
| 2013/0082492 A1* | 4/2013 | Andersson ............. | B60N 3/108 297/188.17 |
| 2019/0001849 A1* | 1/2019 | Edwards ................ | B60N 2/206 |
| 2019/0184873 A1* | 6/2019 | Ferrari ................... | B60N 2/682 |

FOREIGN PATENT DOCUMENTS

EP    1896288 B1    3/2008

OTHER PUBLICATIONS

French Preliminary Search Report for French App. No. 2004686 dated Jan. 18, 2021, BET210057, 8 pages, No English Translation Available.

* cited by examiner

*Primary Examiner* — Mark R Wendell
(74) *Attorney, Agent, or Firm* — Barnes & Thornburg LLP

(57) ABSTRACT

The present disclosure relates to an armrest for a set of seats of a motor vehicle, the armrest comprising an internal frame, a first insert, and a second insert, the internal frame comprising a first side and a second side, wherein the first insert comprises a first surface, at least one hole, and at least one first lug, and the second insert comprises a second surface, at least one hole, and at least one second lug, wherein the first side and the second side of the internal frame each comprise at least one protuberance, the at least one protuberance being shaped for insertion into the at least one hole of the first insert or into the at least one hole of the second insert.

13 Claims, 2 Drawing Sheets

ADAPTABLE ARMREST FOR A SET OF VEHICLE SEAT

PRIORITY CLAIM

This application claims priority to French Patent Application No. FR20 04686, filed May 13, 2020, which is expressly incorporated by reference herein.

BACKGROUND

The present disclosure relates to an armrest, in particular for a set of motor vehicle seats. The present disclosure also relates to a set of seats for a motor vehicle, comprising such an armrest, and a method for obtaining such an armrest.

SUMMARY

According to the present disclosure, an armrest for a set of seats of a motor vehicle comprises an internal frame, a first insert, and a second insert, the internal frame comprising a first side and a second side, the first insert being connected to the first side of the internal frame, the second insert being connected to the second side of the internal frame, wherein the first insert comprises a first surface and at least one first lug, the at least one first lug extending from said first surface, and the second insert comprises a second surface and at least one second lug, the at least one second lug extending from said second surface, the at least one first lug being shaped to be connected to a first seat and the at least one second lug being shaped to be connected to a second seat.

In illustrative embodiments, the first side and the second side of the internal frame each comprise at least one protuberance, the at least one protuberance extending substantially transversely relative to at least one of the first side and the second side of the internal frame.

In illustrative embodiments, the first insert comprises at least one hole complementary to the at least one protuberance of the first side of the internal frame and the second insert comprises at least one hole complementary to the at least one protuberance of the second side of the internal frame, the at least one protuberance of the first side of the internal frame being shaped to be inserted into the at least one hole of the first insert and the at least one protuberance of the second side of the internal frame being shaped to be inserted into the at least one hole of the second insert.

Thus, for example, changing the shape and dimensions of the at least one first lug and of the at least one second lug makes it possible to adapt the armrest to the specific characteristics of the vehicle without needing to modify the internal frame.

This implies that only between 5% to 10% of the component elements of the armrest have to be modified when the specific characteristics of the vehicle vary, which makes it possible to reduce the costs and manufacturing time of the armrest.

In illustrative embodiments, the armrest has one or more of the following features, alone or in combination:

the at least one first lug extends along an axis substantially transverse to said first surface and the at least one second lug extends along an axis substantially transverse to said second surface;

the first side of the internal frame is substantially opposite to the second side of the internal frame;

the at least one protuberance of the first side of the internal frame and the at least one protuberance of the second side of the internal frame have a substantially cylindrical shape;

the first insert comprises a first main lug and the second insert comprises a second main lug, the first main lug and the second main lug forming a shaft for rotation of the armrest about a transverse axis;

the first insert comprises a first secondary lug and the second insert comprises a second secondary lug, the first secondary lug and the second secondary lug forming a stop preventing rotation of the armrest about said transverse axis beyond at least one of a deployed position of the armrest and a stowed position of the armrest;

the internal frame is made of polymer;

the first insert and the second insert each comprise at least one metal part;

the at least one hole of the first insert is arranged in the at least one metal part of the first insert, and the at least one hole of the second insert is arranged in the at least one metal part of the second insert;

the first insert and the second insert are made of metal;

the first side and the second side of the internal frame each comprise at least three protuberances; and the armrest further comprises at least one of: a storage area; and a human-machine interface; and a USB socket; and a cup holder; and a mobile phone holder; and a wireless charging device for a mobile phone; and a lighting device.

In illustrative embodiments, a set of seats for a motor vehicle is described, the set of seats comprising a first seat, a second seat, and an armrest as described above, the first seat and second seat being arranged laterally relative to one another, the armrest being arranged between the first seat and the second seat.

According to another aspect, a method for obtaining an armrest as described above is described, the method comprising:

a step of manufacturing the internal frame, for example by plastic injection; then a step of mounting the first insert on the first side of the internal frame and mounting the second insert on the second side of the internal frame, the mounting step comprising the positioning of the at least one hole of the first insert around the at least one protuberance of the first side of the internal frame and the positioning of the at least one hole of the second insert around the at least one protuberance of the second side of the internal frame.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements.

In the following description, the indications of spatial positioning such as top, bottom, upper, lower, horizontal, vertical etc. are given for clarity of the description, according to the usual position of use of the set of seats, but are not limiting.

Longitudinal direction is understood to mean any direction extending between the front and rear of the set of seats. Transverse direction is understood to mean any direction extending from one side of the set of seats to the other side of the set of seats. For example, the longitudinal and transverse directions are substantially horizontal. Vertical direction is understood to mean any direction perpendicular to the longitudinal and transverse directions.

Figure 1:
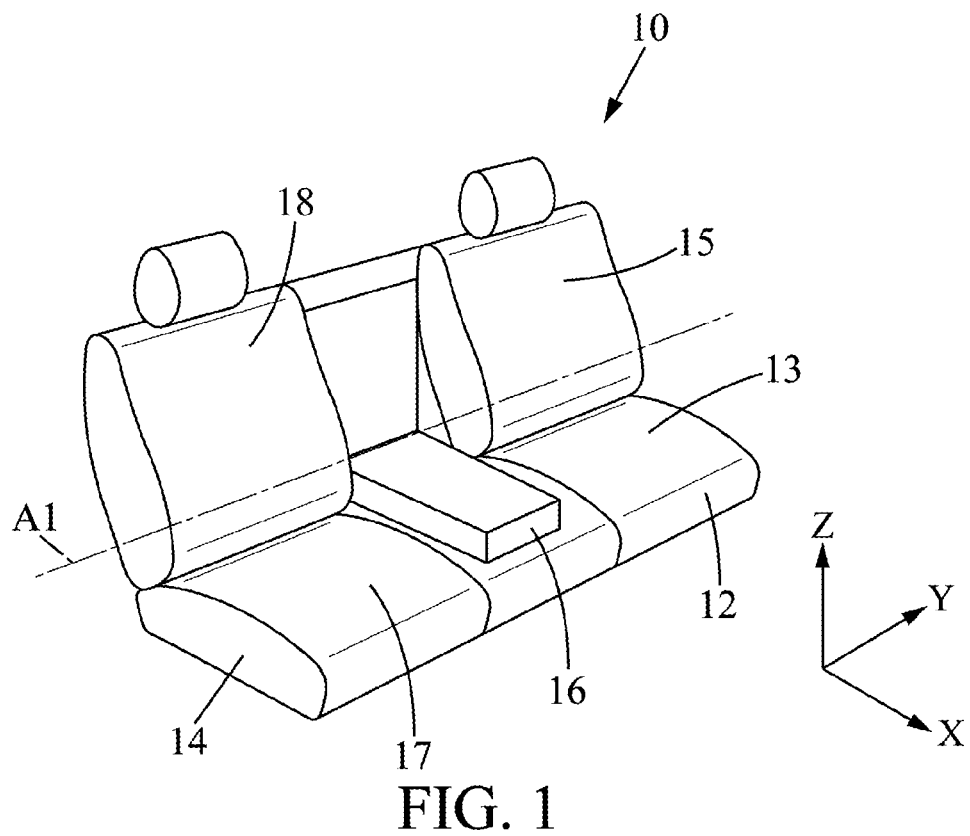
FIG. 1 shows a schematic perspective view of a set of seats for a vehicle, according to the present disclosure.

FIG. 1 shows a set of seats 10 for a motor vehicle. The motor vehicle may be a conventional or an autonomous vehicle.

The set of seats 10 is intended to be connected to the floor of the vehicle. The set of seats 10 comprises a first seat 12, a second seat 14, and an armrest 16. The first seat 12 and second seat 14 are arranged laterally relative to one another. The first seat 12 and second seat 14 thus are part of the same row of seats, the row of seats extending in a transverse direction Y. For example, the first seat 12 and second seat 14 are part of a rear row of seats of the vehicle.

The first seat 12 comprises a first seating portion 13 and a first backrest 15. Similarly, the second seat 14 comprises a second seating portion 17 and a second backrest 18.

The armrest 16 is arranged between the first seat 12 and the second seat 14. For example, the width of the armrest 16 is substantially equal to the distance separating the first seat 12 and second seat 14 in the transverse direction Y. The width of the armrest 16 corresponds in particular to the measurement of the extent of the armrest 16 in the transverse direction Y. The armrest 16 thus makes it possible to connect the first and second seats 12, 14. In particular, the armrest 16 connects the first backrest 15 and second backrest 18.

For example, the armrest 16 is mounted so as to rotate about a transverse axis A1 relative to the first and second backrests 15, 18. The transverse axis A1 is substantially parallel to the transverse direction Y. The armrest 16 can thus be moved between a stowed position and a deployed position. In the stowed position, the armrest 16 forms, with the first and second backrests 15, 18, an angle of between 0 degrees and 10 degrees, for example, between 0 degrees and 5 degrees, for example substantially equal to 0 degrees. In the deployed position, the armrest 16 forms, with the first and second backrests 15, 18, an angle of between 85 degrees and 110 degrees, for example between 90 degrees and 95 degrees. For example, the armrest 16 can be maintained in any other position between the stowed position and the deployed position.

For example, the armrest 16 is an independent element. Alternatively, the armrest 16 forms part of a central seat arranged between the first and second seats 12, 14. For example, the armrest 16 corresponds to a portion of a backrest of the central seat, mounted so as to rotate about axis A1, relative to the first and second backrests 15,18, between the stowed position and the deployed position.

Figure 2:
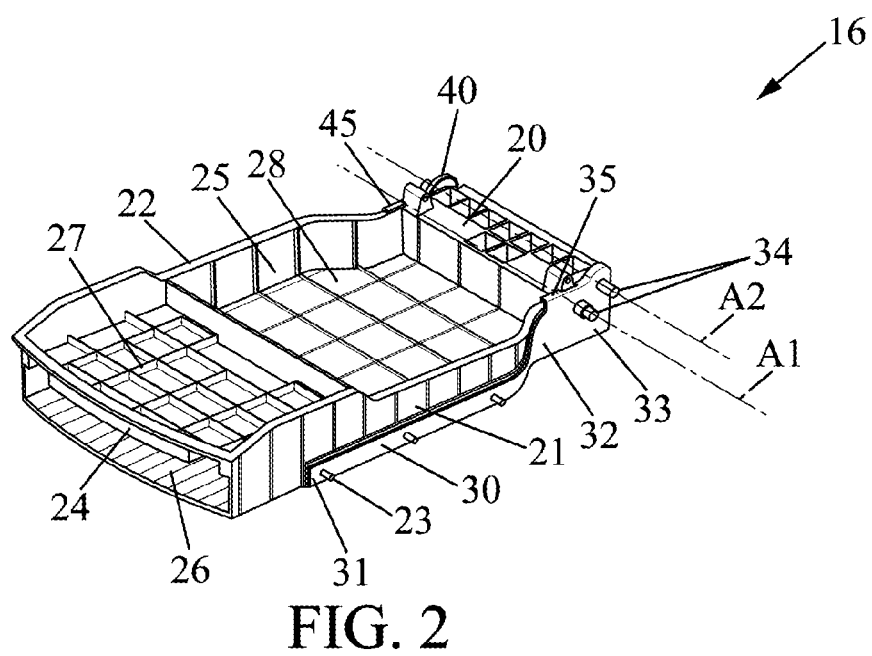
FIG. 2 shows a schematic perspective view of an internal structure of an armrest according to the present disclosure.
Figure 3:
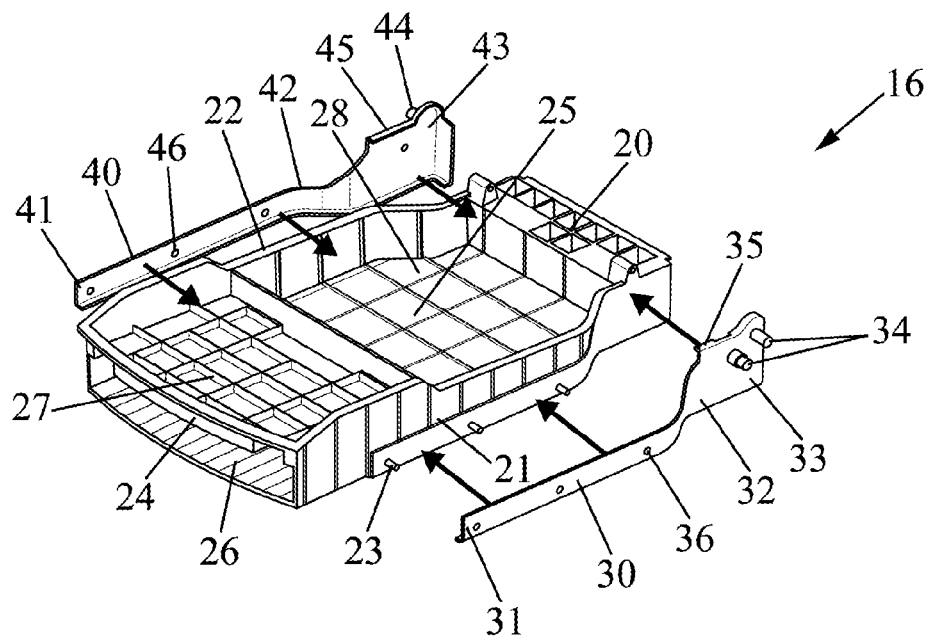
FIG. 3 shows a schematic exploded perspective view of the internal structure of the armrest of FIG. 2.

An internal structure of the armrest 16 will now be described with reference to FIGS. 2 and 3.

The armrest 16 comprises an internal frame 20, a first insert 30, and a second insert 40.

The internal frame 20 has a substantially parallelepipedal shape. The internal frame 20 comprises a first side 21 and a second side 22. The first side 21 is substantially opposite to the second side 22. The first and second sides 21, 22 extend substantially in a longitudinal direction X when the armrest 16 is in the deployed position.

The first side 21 and the second side 22 each comprise at least one protuberance 23. For example, the first side 21 and the second side 22 each comprise at least two protuberances 23. For example, the first side 21 and the second side 22 may each comprise a number of protuberances 23 that is equal to two, three, four, five, six, seven, eight, nine, or ten. For example, the first side 21 and the second side 22 each comprise at least three protuberances 23.

For example, the first side 21 and the second side 22 have the same number of protuberances 23. Alternatively, the first side and the second side have a different number of protuberances 23. For example, the first side 21 may comprise four protuberances 23 and the second side 22 may comprise two protuberances 23. Alternatively, for example, the first side 21 may comprise three protuberances 23 and the second side 22 may comprise seven protuberances 23.

Each protuberance 23 extends substantially transversely to the first side 21 and/or to the second side 22 of the internal frame 20.

For example, each protuberance 23 has a substantially cylindrical shape.

For example, each protuberance 23 is formed integrally with the first side 21 and/or the second side 22. Alternatively, each protuberance 23 is a part assembled onto the first side 21 and/or the second side 22.

The internal frame 20 further comprises a front face 24 and an upper face 25. The front face 24 comprises a first space 26. The upper face 25 comprises a second space 27 and a third space 28. The first, second, and third spaces 26, 27, 28 make it possible to add functionalities to the armrest 16 which will be detailed with reference to FIG. 4.

For example, the internal frame 20 is made of polymer. Thus, for example, the internal frame 20 is both light and strong. For example, the internal frame 20 is obtained by plastic injection or thermoforming.

Alternatively, the internal frame 20 may be made of metal.

The first insert 30 comprises a first surface 32 and at least one first lug 34.

The first surface 32 has a shape substantially complementary to the first side 21 of the internal frame 20 so that the first insert 30 can be installed along the first side 21. Thus, when the armrest 16 is in the deployed position, the first insert 30 extends in the longitudinal direction X between a forward end 31 and a rearward end 33.

The first insert 30 comprises at least one hole 36 complementary to the at least one protuberance 23 of the first side 21 of the internal frame 20. More precisely, the first insert 30 comprises a hole 36 complementary to each protuberance 23 of the first side 21. Each hole 36 extends through the first surface 32.

The shape and dimension of each hole 36 are chosen so that each protuberance 23 of the first side 21 can be inserted into the complementary hole 36. In particular, the cross-sectional area of each hole 36 is substantially equal to the cross-sectional area of each protuberance 23 of the first side 21. In order to keep each protuberance 23 in the complementary hole 36, a snap-riveting, riveting, or overmolding process is applied to each protuberance 23 after insertion of the protuberance 23 into the hole 36.

Alternatively, the shape and dimension of each hole 36 are chosen so that each protuberance 23 of the first side 21 can be snap-fitted into the complementary hole 36.

The first insert 30 is thus connected to the first side 21 of the internal frame 20.

Additionally or alternatively, in order to connect the first insert 30 and the first side 21, the first insert 30 is screwed onto the first side 21. Additionally or alternatively, the first insert 30 comprises at least one tongue 35 which allows connecting the first insert 30 to the first side 21 by snap-fitting.

The at least one first lug 34 extends from the first surface 32. In particular, the at least one first lug 34 extends from the rearward end 33 of the first surface 32. The at least one first lug 34 extends along an axis substantially transverse to the first surface 32. Thus, the at least one first lug 34 extends substantially parallel to the transverse direction Y.

The geometry, cross-sectional area, and length of the at least one first lug 34 are chosen so that the at least one first lug 34 can be connected to the first seat 12.

In the case in question, the first insert 30 comprises a first main lug 34 and a first secondary lug 34. For example, the first main lug 34 is located longitudinally forward of the first secondary lug 34.

For example, the first main lug 34 extends from the first surface 32 along the transverse axis A1. Thus, the first main lug 34 enables rotation of the armrest 16 about the transverse axis A1 relative to the first seat 12. The first main lug 34 therefore forms a shaft for rotation of the armrest 16 about the transverse axis A1. The first secondary lug 34 extends from the first surface 32 along a transverse axis A2. Transverse axis A2 is substantially parallel to the transverse direction Y. The first secondary lug 34 forms a stop preventing rotation of the armrest 16 beyond the deployed position and/or in beyond the stowed position.

The second insert 40 comprises a second surface 42 and at least one second lug 44.

The second surface 42 has a shape substantially complementary to the second side 22 of the internal frame 20 such that the second insert 40 can be installed along the second side 22. Thus, when the armrest 16 is in the deployed position, the second insert 40 extends in the longitudinal direction X between a forward end 41 and a rearward end 43.

The second insert 40 comprises at least one hole 46 complementary to the at least one protuberance 23 of the second side 22 of the internal frame 20. More precisely, the second insert 40 comprises a hole 46 complementary to each protuberance 23 of the second side 22. Each hole 46 extends through the second surface 42.

The shape and dimension of each hole 46 are chosen so that each protuberance 23 of the second side 22 can be inserted into the complementary hole 46. In particular, the cross-sectional area of each hole 46 is substantially equal to the cross-sectional area of each protuberance 23 on the second side 22. In order to keep each protuberance 23 in the complementary hole 46, a snap-riveting, riveting, or overmolding process is applied to each protuberance 23 after insertion of the protuberance 23 into the hole 46.

Alternatively, the shape and dimension of each hole 46 are chosen so that each protuberance 23 of the second side 22 can be snap-fitted into the complementary hole 46.

The second insert 40 is thus connected to the second side 22 of the internal frame 20.

Additionally or alternatively, in order to connect the second insert 40 and the second side 22, the second insert 40 is screwed onto the second side 22. Additionally or alternatively, the second insert 40 comprises at least one tongue 45 which allows connecting the second insert 40 to the second side 22 by snap-fitting.

The at least one second lug 44 extends from the second surface 42. In particular, the at least one second lug 44 extends from the rearward end 43 of the second surface 42. The at least one second lug 44 extends along an axis substantially transverse to the second surface 42. Thus, the at least one second lug 44 extends substantially parallel to the transverse direction Y.

The geometry, cross-sectional area, and length of the at least one second lug 44 are chosen so that the at least one second lug 44 can be connected to the second seat 14.

In the case in question, the second insert 40 comprises a second main lug 44 and a second secondary lug 44. For example, the second main lug 44 is located longitudinally forward of the second secondary lug 44.

For example, the second main lug 44 extends from the second surface 42 along the transverse axis A1. Thus, the second main lug 44 enables rotation of the armrest 16 about the transverse axis A1 relative to the second seat 14. The second main lug 44 therefore forms a shaft for rotation of the armrest 16 about the transverse axis A1. The second secondary lug 44 extends from the second surface 42 along a transverse axis A2. The second secondary lug 44 forms a stop preventing rotation of the armrest 16 beyond the deployed position and/or beyond the stowed position.

The first and second inserts 30, 40 each comprise at least one metal part. For example, each hole 36 is arranged in the metal part of the first insert 30. Similarly, each hole 46 is arranged in the metal part of the second insert 40.

Alternatively, the first and second inserts 30, 40 are made of metal.

In one example, the first and second inserts 30, 40 are obtained by stamping, cutting, and laser welding. In particular, the first and second surfaces 32, 42 are obtained by stamping and cutting. The at least one first lug 34 and the at least one second lug 44 are then respectively connected to the first surface 32 and to the second surface 42 by laser welding.

Figure 4:
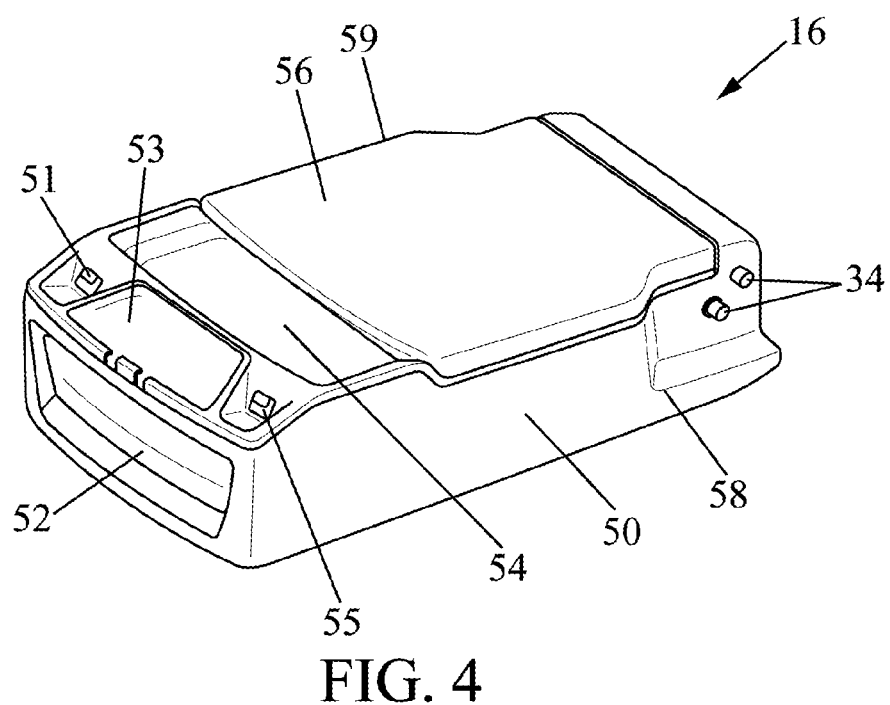
FIG. 4 shows a schematic perspective view of an external structure of the armrest of FIG. 2.

An external structure of the armrest 16 will now be described with reference to FIG. 4.

The internal frame 20, the first insert 30, and the second insert 40 are housed in a housing 50. The housing 50 makes it possible to adjust the width of the internal frame 20 to the distance separating the first and second seats 12, 14. Thus, the width of the armrest 16 is substantially equal to said distance separating the first and second seats 12, 14.

The housing 50 comprises a first side 58 and a second side 59. The first and second sides 58, 59 extend substantially parallel to the first and second sides 21, 22 of the internal frame 20. The first side 58 comprises at least one hole provided for the passage of the at least one first lug 34. In particular, the first side 58 comprises the same number of holes as there are first lugs 34 on the first insert 30. Each first lug 34 can thus be connected to the first seat 12. For example, the second side 59 also comprises at least one hole provided for the passage of the at least one second lug 44. In particular, the second side 59 comprises the same number of holes as there are second lugs 44 on the second insert 40. Each second lug 44 can thus be connected to the second seat 14.

The housing 50 surrounds the entire internal frame 21, with the exception of the first, second, and third spaces 26, 27, 28. Functionalities can thus be integrated into the armrest 16.

For example, the armrest 16 may comprise one or more of the following functionalities:
 a storage area (not shown); and/or
 a human-machine interface (not shown); and/or
 a USB socket 51; and/or
 a cup holder 52; and/or
 a holder for a mobile phone 53; and/or a wireless charging device 54 for a mobile phone; and/or a lighting device 55.

In one example, the storage area is provided in the third space 28. For example, the storage area is covered by a cover 56. For example, the cover 56 is mounted so as to rotate about an axis substantially transverse to the housing 50. The cover 56 is for example made of foam. When the cover 56 covers the storage area, the cover 56 serves as an arm support for an occupant of the first seat 12 and/or for an occupant of the second seat 14.

For example, the USB socket 51, and/or the phone holder 53, and/or the wireless charging device 54, and/or the lighting device 55, are arranged in the second space 27. For example, the phone holder 53 may be arranged forward of the wireless charging device 54, the USB socket 51 and/or the lighting device being arranged laterally relative to the phone holder 53.

For example, the cup holder 52 is provided in the first space 26. For example, the cup holder 52 comprises a movable part and a fixed part, not shown. The movable part is slidably mounted relative to the fixed part. The movable part slides in the longitudinal direction X when the armrest 16 is in the deployed position. Thus, the cup holder 52 can be moved between a stowed position, in which the fixed part and the movable part are inside the first space 26, and a position of use, in which a movable part of the cup holder 52 is outside the first space 26.

The above arrangement of the functionalities comprised in the armrest 16 offers an ergonomic advantage. However, this arrangement is not limited, and any other arrangement of the various functionalities could be considered.

Furthermore, the armrest may have several identical functionalities. For example, the armrest 16 could have two USB functionalities.

The armrest 16 may contain only some of the functionalities presented above. Upgrades to the versions of the armrest 16 are thus possible according to the number and type of functionalities comprised in the armrest 16.

The armrest 16 may be entirely or partially covered by a foam covering, not shown. The foam covering allows, among other things, adjusting the width of the armrest 16 to the distance separating the first seat 12 from the second seat 14.

A method for obtaining the armrest 16 will now be described.

The method comprises a step of manufacturing the internal frame 20. As explained above, the internal frame 20 is obtained, for example, by plastic injection or by thermoforming.

Once the internal frame 20 is manufactured, the method comprises a step of mounting the first insert 30 on the first side 21 of the internal frame 20 and of mounting the second insert 40 on the second side 22 of the internal frame 20.

The mounting step comprises in particular the positioning of each hole 36 and each hole 46 around each protuberance 23 of the first and second sides 21, 22 of the internal frame 20. Each protuberance 23 is thus inserted into one of the holes 36, 46.

After the assembly step, the first and second inserts 30, 40 are respectively connected to the first and second sides 21, 22. As explained above, in order to connect the first and second inserts 30, 40 to the first and second sides 21, 22, a snap-riveting, riveting, or overmolding process is applied to each protuberance 26 inserted into the complementary holes 36, 46. Alternatively, each protuberance 26 may be snap-fitted into the holes 36, 46. Alternatively, the first and second inserts 30, 40 may be connected to the first and second sides 21, 22 by snap-fitting or screwing the first and second inserts 30, 40 onto the first and second sides 21, 22.

The internal frame 21 connected to the first and second inserts 30, 40 is then installed in the housing 50. The set of functionalities can then be installed in the armrest 16.

Finally, the armrest 16 may be completely or partially covered with the foam covering.

Note that the armrest 16 according to the present disclosure can be adapted to the distinctive features of several different seats, by modifying only the geometry of the first and second inserts 30, 40 and/or of the housing 50 and/or, optionally, of the foam covering. The internal frame 21 can thus remain unchanged for different seats.

This disclosure is not limited to the example described above with reference to the figures. This disclosure also encompasses all variants and combinations conceivable to a person skilled in the art within the framework of the protection sought.

In the automotive field in particular, a comparative vehicle seat is provided with a comparative armrest.

Generally, the comparative armrest is connected to the seat by connection means which differ according to the automobile manufacturer, the vehicle model, and/or the type of seat, for example.

Similarly, the space available for the comparative armrest inside the vehicle varies according to the automobile manufacturer, the vehicle model, and/or the type of seat, among other factors. The shape and/or dimensions of the comparative armrest thus must be adapted to the space available inside the vehicle. This is the case in particular when the armrest is an armrest shared by two seats arranged laterally relative to one another. Such a comparative shared armrest may be employed for the rear seats of the vehicle.

The comparative armrest must thus be designed according to the specific characteristics of the vehicle in which it is intended to be installed. This implies that the manufacturing process and the tools used during the process must be adapted to the armrest to be manufactured, which leads to an increase in costs and in manufacturing time.

This disclosure is intended to improve the situation.

To this end, an armrest is described for a set of seats of a motor vehicle, the armrest comprising an internal frame, a first insert, and a second insert, the internal frame comprising a first side and a second side, the first insert being connected to the first side of the internal frame, the second insert being connected to the second side of the internal frame, wherein the first insert comprises a first surface and at least one first lug, the at least one first lug extending from said first surface, and the second insert comprises a second surface and at least one second lug, the at least one second lug extending from said second surface, the at least one first lug being shaped to be connected to a first seat and the at least one second lug being shaped to be connected to a second seat, wherein the first side and the second side of the internal frame each comprise at least one protuberance, the at least one protuberance extending substantially transversely relative to at least one of the first side and the second side of the internal frame, wherein the first insert comprises at least one hole complementary to the at least one protuberance of the first side of the internal frame and the second insert comprises at least one hole complementary to the at least one protuberance of the second side of the internal frame, the at least one protuberance of the first side of the internal frame being shaped to be inserted into the at least one hole of the first insert and the at least one protuberance of the second side of the internal frame being shaped to be inserted into the at least one hole of the second insert.

Thus, for example, changing the shape and dimensions of the at least one first lug and of the at least one second lug makes it possible to adapt the armrest to the specific characteristics of the vehicle without needing to modify the internal frame.

This implies that only between 5% to 10% of the component elements of the armrest have to be modified when the specific characteristics of the vehicle vary, which makes it possible to reduce the costs and manufacturing time of the armrest.

According to illustrative embodiments, the armrest has one or more of the following features, alone or in combination:

the at least one first lug extends along an axis substantially transverse to said first surface and the at least one second lug extends along an axis substantially transverse to said second surface;

the first side of the internal frame is substantially opposite to the second side of the internal frame;

the at least one protuberance of the first side of the internal frame and the at least one protuberance of the second side of the internal frame have a substantially cylindrical shape;

the first insert comprises a first main lug and the second insert comprises a second main lug, the first main lug and the second main lug forming a shaft for rotation of the armrest about a transverse axis;

the first insert comprises a first secondary lug and the second insert comprises a second secondary lug, the first secondary lug and the second secondary lug forming a stop preventing rotation of the armrest about said transverse axis beyond at least one of a deployed position of the armrest and a stowed position of the armrest;

the internal frame is made of polymer;

the first insert and the second insert each comprise at least one metal part;

the at least one hole of the first insert is arranged in the at least one metal part of the first insert, and the at least one hole of the second insert is arranged in the at least one metal part of the second insert;

the first insert and the second insert are made of metal;

the first side and the second side of the internal frame each comprise at least three protuberances; and the armrest further comprises at least one of: a storage area; and a human-machine interface; and a USB socket; and a cup holder; and a mobile phone holder; and a wireless charging device for a mobile phone; and a lighting device.

According to another aspect, a set of seats for a motor vehicle is described, the set of seats comprising a first seat, a second seat, and an armrest as described above, the first seat and second seat being arranged laterally relative to one another, the armrest being arranged between the first seat and the second seat.

According to another aspect, a method for obtaining an armrest as described above is described, the method comprising:

a step of manufacturing the internal frame, for example by plastic injection; then a step of mounting the first insert on the first side of the internal frame and mounting the second insert on the second side of the internal frame, the mounting step comprising the positioning of the at least one hole of the first insert around the at least one protuberance of the first side of the internal frame and the positioning of the at least one hole of the second insert around the at least one protuberance of the second side of the internal frame.

The invention claimed is:

1. An armrest for a set of seats of a motor vehicle, the armrest comprising an internal frame, a first insert, and a second insert, the internal frame comprising a first side and a second side, the first insert being connected to the first side of the internal frame, the second insert being connected to the second side of the internal frame, wherein the first insert comprises a first surface and at least one first lug, the at least one first lug extending from said first surface, and the second insert comprises a second surface and at least one second lug, the at least one second lug extending from said second surface, the at least one first lug being shaped to be connected to a first seat and the at least one second lug being shaped to be connected to a second seat, wherein the first side and the second side of the internal frame each comprise at least one protuberance, the at least one protuberance extending substantially transversely relative to at least one of the first side and the second side of the internal frame, wherein the first insert comprises at least one hole complementary to the at least one protuberance of the first side of the internal frame and the second insert comprises at least one hole complementary to the at least one protuberance of the second side of the internal frame, the at least one protuberance of the first side of the internal frame being shaped to be inserted into the at least one hole of the first insert and the at least one protuberance of the second side of the internal frame being shaped to be inserted into the at least one hole of the second insert, wherein the first insert comprises a first main lug and the second insert comprises a second main lug, the first main lug and the second main lug forming a shaft for rotation of the armrest about a transverse axis, and wherein the first insert comprises a first secondary lug and the second insert comprises a second secondary lug, the first secondary lug and the second secondary lug forming a stop preventing rotation of the armrest about said transverse axis beyond at least one of a deployed position of the armrest and a stowed position of the armrest.

2. The armrest of claim 1, wherein the at least one first lug extends along an axis substantially transverse to said first surface and the at least one second lug extends along an axis substantially transverse to said second surface.

3. The armrest of claim 1, wherein the first side of the internal frame is substantially opposite to the second side of the internal frame.

4. The armrest of claim 1, wherein the at least one protuberance of the first side of the internal frame and the at least one protuberance of the second side of the internal frame have a substantially cylindrical shape.

5. The armrest of claim 1, wherein the internal frame is made of a polymer.

6. The armrest of claim 1, wherein the first insert and the second insert each comprise at least one metal part.

7. The armrest of claim 6, wherein the at least one hole of the first insert is arranged in the at least one metal part of the first insert and the at least one hole of the second insert is arranged in the at least one metal part of the second insert.

8. The armrest of claim 1, wherein the first insert and the second insert are made of metal.

9. The armrest of claim 1, the armrest further comprising at least one of:
- a storage area; and
- a human-machine interface; and
- a USB socket; and
- a cup holder; and
- a mobile phone holder; and
- a wireless charging device for a mobile phone; and
- a lighting device.

10. A set of seats for a motor vehicle, the set of seats comprising
the first seat, the second seat, and the armrest according to claim 1, the first seat and the second seat being arranged laterally relative to one another, the armrest being arranged between the first seat and the second seat.

11. A method for obtaining the armrest according to claim 1, the method comprising:
- a step of manufacturing the internal frame; then
- a step of mounting the first insert on the first side of the internal frame and mounting the second insert on the second side of the internal frame, the mounting step comprising the positioning of the at least one hole of the first insert around the at least one protuberance of the first side of the internal frame and the positioning of the at least one hole of the second insert around the at least one protuberance of the second side of the internal frame.

12. The method of claim 11, wherein the step of manufacturing comprises manufacturing the internal frame by plastic injection.

13. An armrest for a set of seats of a motor vehicle, the armrest comprising
an internal frame, a first insert, and a second insert, the internal frame comprising a first side and a second side, the first insert being connected to the first side of the internal frame, the second insert being connected to the second side of the internal frame,
wherein the first insert comprises a first surface and at least one first lug, the at least one first lug extending from said first surface, and the second insert comprises a second surface and at least one second lug, the at least one second lug extending from said second surface, the at least one first lug being shaped to be connected to a first seat and the at least one second lug being shaped to be connected to a second seat,
wherein the first side and the second side of the internal frame each comprise at least one protuberance, the at least one protuberance extending substantially transversely relative to at least one of the first side and the second side of the internal frame,
wherein the first insert comprises at least one hole complementary to the at least one protuberance of the first side of the internal frame and the second insert comprises at least one hole complementary to the at least one protuberance of the second side of the internal frame, the at least one protuberance of the first side of the internal frame being shaped to be inserted into the at least one hole of the first insert and the at least one protuberance of the second side of the internal frame being shaped to be inserted into the at least one hole of the second insert, and
wherein the first side and the second side of the internal frame each comprise at least three protuberances.

* * * * *